(No Model.)

F. ASHLEY.
BICYCLE WHEEL.

No. 481,460. Patented Aug. 23, 1892.

Witnesses
E. S. Duvall Jr.
Philip C. Masi.

Inventor
Fred. Ashley.
by E. W. Anderson
his Attorney

THE NORRIS PETERS CO., PHOTO-LITHO., WASHINGTON, D. C.

UNITED STATES PATENT OFFICE.

FREDERICK ASHLEY, OF BROOKLYN, NEW YORK.

BICYCLE-WHEEL.

SPECIFICATION forming part of Letters Patent No. 481,460, dated August 23, 1892.

Application filed October 30, 1891. Serial No. 410,347. (No model.)

*To all whom it may concern:*

Be it known that I, FREDERICK ASHLEY, a citizen of the United States, and a resident of Brooklyn, in the county of Kings and State of New York, have invented certain new and useful Improvements in Bicycle-Wheels; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
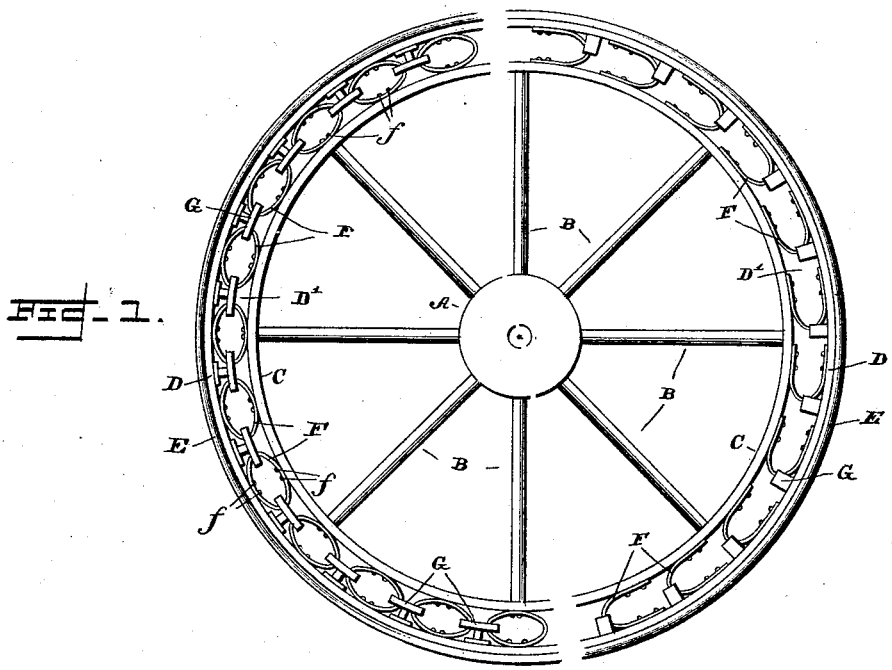
Figure 2:
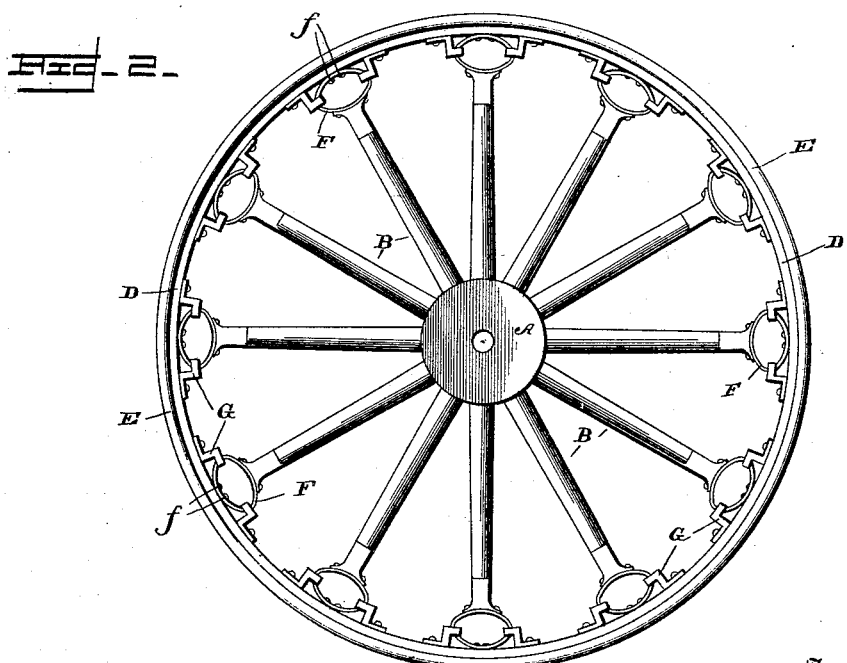

Figure 1 of the drawings is a side elevation, and Fig. 2 is a side elevation with omission of the inner felly.

This invention has relation to certain new and useful improvements in bicycle and other wheels; and it consists in the novel construction and combination of parts, as hereinafter described, and pointed out in the claims.

In the accompanying drawings, the letter A designates the hub of the wheel, and B the spokes.

C designates an inner rim or felly secured to the spokes in any suitable or well-known manner, and D is a second or outer felly separated from felly C by the annular space or chamber D'. This second or outer felly is of considerably less thickness than the inner felly, and is preferably designed to be somewhat yielding or flexible under the action of the tire E thereon.

In the chamber or space D' is provided a series of compressible springs F. I have shown these springs as elliptic in form; but I desire it to be understood that they may be instead semi-elliptic, circular, semicircular, leaf, spiral, or elongated, as may be found most suitable for the particular construction of wheel to which they are applied. Said springs may be secured in place by the bolts or screws *f*, which enter the respective rims or fellies.

Guides G are provided between each pair of springs and serve to stiffen them and hold them to their proper action. I have shown the springs arranged one at the end of each spoke, others being placed between in the spaces, so as to afford a continuous series.

I may sometimes construct the wheel as shown in Fig. 2, wherein the inner felly is omitted, the springs being placed directly between the outer ends of the spokes and the felly.

Having described this invention, what I claim as new, and desire to secure by Letters Patent, is—

1. A wheel having an inner and an outer felly separated from each other by an annular chamber or space, said outer felly being compressible under the tire, a series of springs located in said chamber or space, and guides or stiffeners for said springs, substantially as specified.

2. A wheel having a series of springs between the ends of its spokes and the felly, said springs being held between guides secured to the felly and limiting and stiffening their action, substantially as specified.

In testimony whereof I affix my signature in presence of two witnesses.

FREDERICK ASHLEY.

Witnesses:
 ALBERT C. HOYT,
 JOHN T. ASHLEY.